(12) United States Patent
Parkes et al.

(10) Patent No.: US 10,185,653 B2
(45) Date of Patent: Jan. 22, 2019

(54) INTEGRATED SYSTEMS AND METHODS FOR THE TRANSACTIONAL MANAGEMENT OF MAIN MEMORY AND DATA STORAGE

(71) Applicants: Michael Andrew Brian Parkes, Stourbridge (GB); Gregory Michael Parkes, Stourbridge (GB)

(72) Inventors: Michael Andrew Brian Parkes, Stourbridge (GB); Gregory Michael Parkes, Stourbridge (GB)

( * ) Notice: Subject to any disclaimer, the term of this patent is extended or adjusted under 35 U.S.C. 154(b) by 217 days.

(21) Appl. No.: 15/056,092

(22) Filed: Feb. 29, 2016

(65) Prior Publication Data

US 2017/0010834 A1  Jan. 12, 2017

(30) Foreign Application Priority Data

Jul. 8, 2015 (GB) .................................. 1511960.5

(51) Int. Cl.
*G06F 12/00* (2006.01)
*G06F 12/02* (2006.01)

(52) U.S. Cl.
CPC .... *G06F 12/023* (2013.01); *G06F 2212/1044* (2013.01); *G06F 2212/652* (2013.01)

(58) Field of Classification Search
None
See application file for complete search history.

(56) References Cited

U.S. PATENT DOCUMENTS

| | | | |
|---|---|---|---|
| 9,146,928 B1 * | 9/2015 | Noveck | G06F 17/30088 |
| 2010/0205374 A1 * | 8/2010 | Meka | G06F 12/023 711/117 |
| 2012/0072656 A1 * | 3/2012 | Archak | G06F 17/30132 711/104 |

* cited by examiner

*Primary Examiner* — Baboucarr Faal
(74) *Attorney, Agent, or Firm* — Brient IP Law, LLC (57) ABSTRACT

An integrated system for transactionally managing main memory and storage devices derived from the interfaces and methodologies historically associated with dynamic memory allocation. The methodology has a wide range of applicability including areas such as hardware storage devices (i.e. firmware), operating system internals (i.e. file systems) and end-user software systems.

21 Claims, 10 Drawing Sheets

Step 1.1: Create a new file or storage area.

Step 1.2: Write a new header and a page directory at the start of the file or storage area.

Step 1.3: Write a new heap structure following the header and the page directory in the file or storage area.

Step 1.4: Start an asynchronous logging thread to record any changes made to the file or storage area.

Step 1.1: Create a new file or storage area.

↓

Step 1.2: Write a new header and a page directory at the start of the file or storage area.

↓

Step 1.3: Write a new heap structure following the header and the page directory in the file or storage area.

↓

Step 1.4: Start an asynchronous logging thread to record any changes made to the file or storage area.

Figure 1

Step 2.1: Open the existing file or storage area.

↓

Step 2.2: Read the header into main memory and ensure that it has a suitable structure and does not appear to be damaged in any way.

↓

Step 2.3: Read the page directory and the heap management structure into main memory.

↓

Step 2.4: Start an asynchronous logging thread to record any changes made to the file or storage area.

Figure 2

Step 3.1: Ensure that the file or storage area is open and the heap is ready for use or exit appropriately if this step fails.

↓

Step 3.2: Stop the asynchronous logging thread so we can update the transactional data structures.

↓

Step 3.3: Create a new data structure to manage the new transaction.

↓

Step 3.4: Restart the asynchronous logging thread.

Figure 3

Step 4.1: Ensure that the file or storage area is open and the heap is ready for use or exit appropriately if this step fails.

Step 4.2: Stop the asynchronous logging thread so we can update the transactional data structures.

Step 4.3: Find the appropriate fixed sized allocation structure for the requested size.

Step 4.4: Ensure the current allocation page is in main memory or create a new allocation page and prepare it for use if necessary.

Step 4.5: Find a free allocation in the appropriate allocation page bitmap.

Step 4.6: Compute the main memory address and the storage address of the new allocation.

Step 4.7: Update the storage oriented linked lists and data structures as needed.

Step 4.8: Add the new allocation to the list of transactional storage changes.

Step 4.9: Restart the asynchronous logging thread.

Figure 4

Step 5.1: Ensure that the file or storage area is open and the heap is ready for use or exit appropriately if this step fails.

Step 5.2: Create a new suitably sized allocation in the file or storage device as outlined above in connection with 'New' or exit appropriately if this step fails.

Step 5.3: Copy the contents of the existing allocation into the new allocation.

Step 5.3: Delete the existing allocation in the file or storage device as outlined below in connection with 'Delete'.

Figure 5

Step 6.1: Ensure that the file or storage area is open and the heap is ready for use or exit appropriately if this step fails.

Step 6.2: Stop the asynchronous logging thread so we can update the transactional data structures.

Step 6.3: Find the allocation page using the supplied 'Address' (i.e. by using the high order bits of the 'Address' as an index in the page directory) or exit appropriately if this step fails.

Step 6.4: Ensure the allocation page is in main memory or exit appropriately if this step fails.

Step 6.5: Find the related fixed sized allocation structure using data stored in the allocation page or exit appropriately if this step fails.

Step 6.6: Unset the allocation bit in the related bitmap or exit appropriately if this step fails.

Step 6.7: Delete the entire allocation page if it is empty.

Step 6.8: Update the storage oriented linked lists and data structures as needed.

Step 6.9: Remove the allocation from the list of transactional storage changes if necessary.

Step 6.10: Restart the asynchronous logging thread.

Figure 6

Step 7.1: Ensure that the file or storage area is open and the heap is ready for use or exit appropriately if this step fails.

Step 7.2: Stop the asynchronous logging thread so we can update the transactional data structures.

Step 7.3: Ensure all the changes made in the transaction are applied to the associated pages in main memory.

Step 7.4: Ensure all pages in main memory that contain any changes are marked as being modified.

Step 7.5: Delete any data structures or information that is no longer needed.

Step 7.6: Update the storage oriented linked lists and data structures as needed.

Step 7.7: Restart the asynchronous logging thread.

Figure 7

Step 8.1: Ensure that the file or storage area is open and the heap is ready for use or exit appropriately if this step fails.

Step 8.2: Wait while the asynchronous logging thread writes any remaining changes to the file or storage device.

Step 8.3: Terminate the asynchronous logging thread.

Step 8.4: Release any resources associated with the file or storage device.

Step 8.5: Close the file.

Step 10.1: Ensure that the file or storage area is open and the heap is ready for recovery or exit appropriately if this step fails.

Step 10.2: Allocate a suitable area in main memory for the 'Change Record' or exit appropriately if this step fails.

Step 10.3: Read the 'Change Record' into main memory or exit appropriately if this step fails.

Step 10.4: Write all of the modified pages back to their original place in the file or storage device. This step is repeated until it succeeds or the system fails.

Step 10.5: Update the header page to reflect all the changes that have been made. This step is repeated until it succeeds or the system fails.

Step 10.6: Release any resources that are no longer needed.

Figure 10

INTEGRATED SYSTEMS AND METHODS FOR THE TRANSACTIONAL MANAGEMENT OF MAIN MEMORY AND DATA STORAGE

CROSS-REFERENCE TO RELATED PATENT APPLICATIONS

This application claims priority to United Kingdom Patent Application No. GB 1511960.5, filed Jul. 8, 2015, entitled "An Integrated System for the Transactional Management of Main Memory and Data Storage," the entire disclosure of which is incorporated herein by reference in its entirety.

TECHNICAL FIELD

Various embodiments of the invention are connected to the fields of computer science and information technology. In particular, certain embodiments of the invention provide a transactional memory allocation and data storage methodology that can function at both the program level and operating system level of a computer or related device.

BACKGROUND

The history of dynamic memory allocation can be traced back to around the 1950's [DSA-1995]. It gained significant popularity around the 1980's due to the UNIX operating system and the 'C' programming language. The early programming model in UNIX was based on a collection of documented calls which included functions such as 'calloc', 'malloc', 'realloc' and 'free'. Later, a number of other operating systems and programming languages extended and modified these concepts, such as the 'new' and 'delete' operators in 'C++'.

The history of storage management can be traced back even further than the origins of dynamic memory allocation. Again, many of the concepts and models at the time of writing became popular around the 1980's due to the UNIX operating system. The early programming model in UNIX was based on a collection of documented calls which included functions such as 'open', 'read', 'write' and 'close'. Again, a number of later operating systems extended and modified these concepts, such as Linux and Microsoft Windows.

The history of computer oriented databases can be traced back to around the 1960's and appears to have been related to the introduction and use of direct access storage [HOD-2013]. In particular, the concept of transactions was introduced into databases to ensure that data on backing storage devices could be reliably modified even in the presence of common hardware and software failures (i.e. these are often termed 'ACID' properties). An aspect of various embodiments of the present invention is to transactionally allocate space in main memory and files or storage devices at the same time. Such transactional allocation may help to improve the reliability of the operating system and/or programs, due to the reduction in complexity as a result of the transactional allocation.

A program that uses the classical UNIX file management calls such as 'open', 'read', 'write' and 'close' typically operates in the following way. First it will 'open' the required file. Next, it will allocate some main memory space using a call such as 'malloc'. Next it will 'read' the required part of the file into this main memory area. If this information needs to be changed it will then update the main memory area as necessary and 'write' the updated contents of the main memory area back to the file. Next, it may optionally release the main memory area using a call such as 'free'. Some of these steps may be repeated multiple times if necessary. When the file is no longer needed a call to 'close' is used to release the file.

A significant area of difficulty in a program of this type is that it needs to decide where to place any new data that is added into the file. This is not a problem with main memory allocation as calls such as 'malloc' and 'realloc' automatically do this placement and return a pointer to the allocated space in main memory. A caller does not need to concern themselves with questions about how this is achieved. A caller can simply use the allocated main memory in any way that is necessary for as long as is required. Later, if an allocation is no longer needed it can easily be returned to the heap by a call to 'free'. Such commands and their usage are known in operating systems such as UNIX.

Various embodiments described herein extend the concepts of main memory allocation to files and storage devices so as to simplify file and storage management. In many cases this simplification not only reduces complexity but also improves performance and reliability.

The above has been described with reference to exemplary advantages that are apparent when various embodiments of the invention are performed at an operating system level. Nonetheless, various embodiments of the invention are equally applicable to a wider range of storage devices and related concepts. A number of operating systems (e.g. Microsoft Windows) allow direct access to storage devices from user mode programs. In such cases, various embodiments may be used directly with these devices without modification. In other cases, various embodiments can be integrated into a device driver or firmware to get the desired level of access to the necessary hardware. Consequently, we will use the terms of 'storage area' and 'storage device' from this point forward to highlight that various embodiments of the invention have applicability well beyond operating system files.

In order to reduce the complexities described above, according to an aspect of various embodiments of the invention there is provided a system and method as defined in the appended claims.

BRIEF DESCRIPTION OF THE DRAWINGS

An embodiment of the invention is now described, by way of example only, with reference to the accompanying drawing in which.

DETAILED DESCRIPTION

Various embodiments of the present invention advantageously help enhance performance and reduce the possibility of errors that would typically cause data corruptions, program failures and operating system crashes.

By way of background it is useful to consider some of the algorithms traditionally used in dynamic memory allocators. In such memory allocators a notional function called 'New', or similar, allocates space on a heap in main memory. Typically hardware and operating systems provide chunks of main memory in large blocks (e.g. multiples of 4 k or 64 k). In such memory allocators it is known to use memory oriented linked lists to join these large blocks of memory together. Typically there is provided a linked list of all the allocated memory and a further linked list of all the free memory. When an allocation is made a suitable entry is taken from the free list and entered into the allocated list. If the free list entry is larger than necessary the allocation is typically split into two parts. The first part can then be entered into the allocated list and the remaining part can be left in the free list. If the free list does not contain large enough blocks then a new block of free space is typically created and entered to the free list to be used as necessary. This known methodology is sometimes called the 'Linked list memory allocation' algorithm in the published literature.

An alternative methodology to the 'Linked list memory allocation' algorithm outlined above is to split large blocks of main memory into a number of fixed sized allocations (e.g. say pre-selected sizes from 4 bytes to 64 k and so on). An associated bitmap can then be used to determine whether a particular allocation is in use or is free (typically by setting the appropriate part of the bitmap to '1' for allocated and '0' for free). In such known systems these large blocks of fixed sized allocations are typically linked together with one or more memory oriented linked lists (i.e. a single global list for all sizes or separate lists for each size). In this case, an allocation is made by finding the appropriate fixed sized allocation data structure (i.e. for a request of 3 bytes the algorithm might select a 4 byte fixed sized allocation) and setting the necessary bit in the associated bitmap. This known methodology is sometimes called the 'Segregated fits' algorithm in the published literature.

The description above outlines two well-known memory allocation algorithms. A number of other algorithms are available each with varying trade-offs (such as those outlined in [DSA-1995]).

While such methodologies are known in memory management they suffer from known setbacks, such as fragmentation and poor performance if the linked lists become large. Furthermore, they are unsuitable for managing file or storage space because they use structures, such as linked lists, which are highly inefficient in files or on storages devices as the related access times can be up to 2 million times slower than main memory.

Various embodiments of the present invention improve on some of the general concepts of the 'Segregated fits' algorithm but significant modifications may be necessary in order to make a combined main memory and storage allocator practical. A key change relates to how the internal structures are linked together. Instead of the memory oriented linked lists as per the prior art, the internal structures must be modified to support storage oriented linked lists that use storage addresses (i.e. the offset of the data from the start of the storage area) to link related storage areas together. These storage oriented linked lists require more processing than memory oriented linked lists as each storage address must be looked up in a table, or similar structure, to find where it resides in main memory. If it is not already in main memory then space must be allocated and the related data read from storage into main memory before its contents can be accessed or updated. Additionally, the lookup table must be maintained and updated every time an area of storage is either added or removed from main memory.

Preferably to increase efficiency, various embodiments of the invention minimize the usage of storage linked lists and storage addresses. An operating system or storage device typically provides storage space in large chunks (i.e. 512 bytes, 2 k, 4 k or 64 k). Consequently, various embodiments of the invention always request large chunks of main memory and storage space that match in terms of alignment and size whenever extra space is needed. These matching large chunks of space are known as pages and can optionally be split into smaller sub-pages. Typically, these are the only structures that need to be linked together with storage oriented linked lists which helps keep the related overheads to a minimum. Additionally, all storage oriented linked lists are typically stored in ascending address order to help improve data locality and reduce storage transfers.

A key feature of various embodiments of the invention is its ability to allocate main memory and storage space at the same time. In the preferred manner various embodiments of the invention optimize this process by ensuring all the relevant management structures and their associated allocations are always stored together within a single page wherever practical. All the top level management structures are typically stored at a predetermined location at the start of the page. Therefore, once a page has been loaded into main memory everything required to create, delete or use any of the allocations on the page are guaranteed to be present. The page number can be computed directly from any relevant storage address by simply masking off the low order bits (e.g. typically the bits below 64 k). This page number can be looked up in a table (as mentioned earlier) to see if the page is already present in main memory or whether it needs to be loaded from storage. If a page needs to be loaded from storage then extra main memory will need to be allocated which matches the storage area in terms of alignment and size. The address of this main memory allocation will determine the main memory addresses of all the allocations stored within the page. These main memory addresses can change over time if a page is unloaded from main memory and then reloaded into main memory at a later point. The actual address of each allocation on a page in main memory is computed from the location of the start of the page in main memory plus the low order bits of the storage address (e.g. typically the bits below 64 k). Consequently, accessing an existing allocation that is not in main memory typically only involves reading a single page into main memory and all the key pieces of necessary information to dive this process are provided by the related storage address.

A similar picture emerges when creating or deleting an allocation. When creating an allocation the requested size is used to navigate to a suitable fixed sized allocation structure (i.e. the smallest fixed sized allocation structure that is greater or equal to the requested size). The allocation structure typically has a list of pages or sub-pages that contain suitable fixed sized allocations. A search is made of this list to find a page that contains a free allocation using the associated allocation bitmaps stored within each page. This search for a free allocation is made in ascending address order so as to help with data locality. If a suitable free allocation is found then an appropriate portion of the bitmap is updated as necessary. If no suitable allocation is found a new page is created and added to the appropriate list and then used to make the allocation. When deleting an allocation the page number is computed from the storage address, as outlined earlier. The page is then bought into memory, if not already present. The data stored at the start of the page is used to navigate to the appropriate portion of the bitmap based on the supplied storage address. The bitmap can then be updated as necessary. The above processes and structures are another key feature of various embodiments of the invention and permit it to efficiently create, delete and use allocations within a file or storage device.

A particular embodiment of the invention and the processes by which main memory and storage space are allocated is described below with reference to a number of examples, drawings and flowcharts. These examples, drawings and flowcharts are described with reference to the process being executed at an operating system level. It will be appreciated that the process described is also applicable to processes that could be performed at a program level.

The following simple, self-complete program, demonstrates the concept of allocating space within main memory and an operating system file at the same time. The following example has been provided in C++, as would be used in many operating systems.

```
#include "DatabaseHeap.hpp"
#include <string.h>
int main( void )
{
  DATABASE_HEAP Heap;
  if ( Heap.CreateFile( "MyFile.DB" ) )
  {
    if ( Heap.BeginTransaction( ) )
    {
      long long Address;
      int Size1 = 16;
      int Size2 = 20;
      char *Data;
      if ( Heap.New( & Address,((void**) & Data),Size1 ) )
      {
        strcpy( Data,"Hello world !" );
        if ( Heap.Resize( & Address,((void**) & Data),Size2 ) )
          { strcpy( Data,"Goodbye world !" ); }
        Heap.Delete( Address );
      }
      Heap.EndTransaction( );
    }
    Heap.CloseFile( );
  }
  return 0;
}
```

A 'DATABASE_HEAP' in the embodiment of the invention described above supports the allocation of space within main memory and storage devices.

In contrast to the prior art, this embodiment utilizes a function named 'CreateFile'.

This function creates a new storage object and associates it with the 'DATABASE_HEAP' class mentioned above. A flowchart outlining the execution of the 'CreateFile' function is as shown in FIG. 1.

Figure 1:
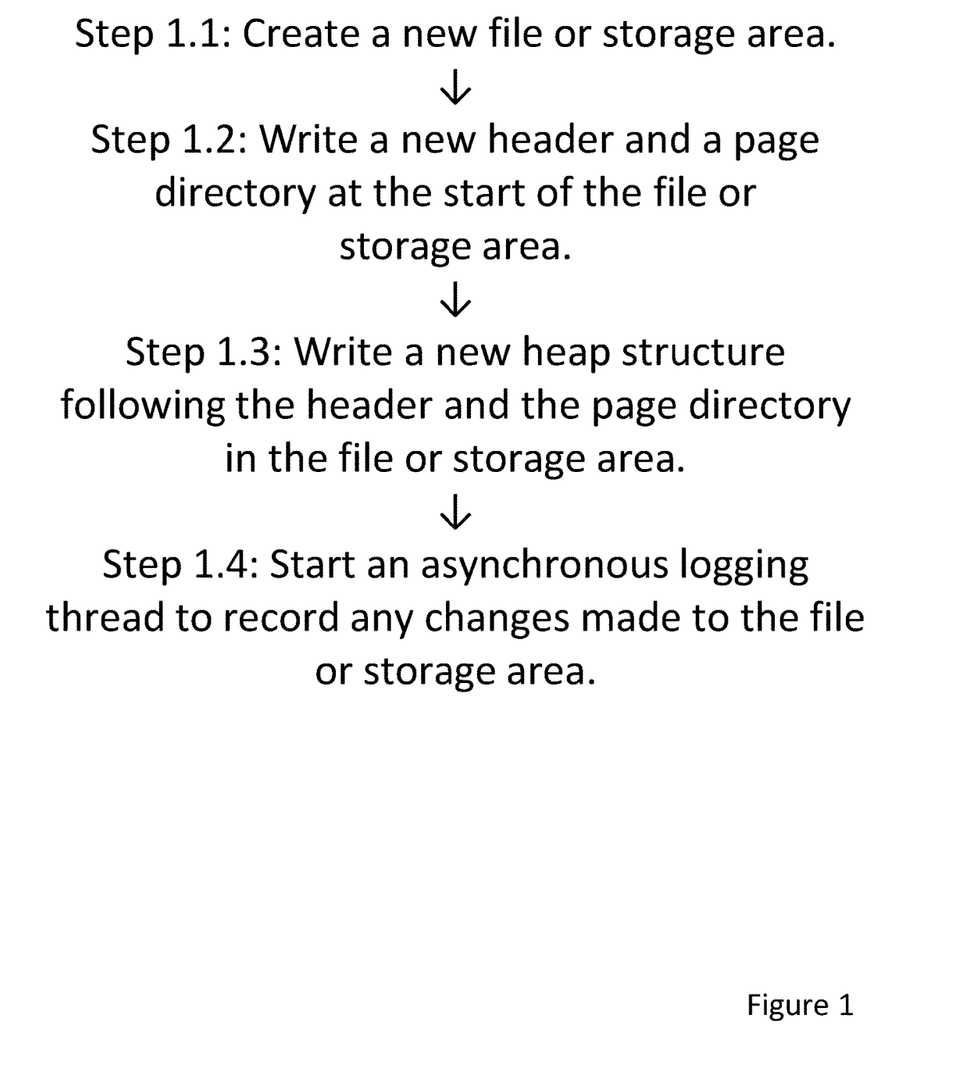
FIG. 1 is a flowchart of the functionality to create a file according to a first embodiment of the invention.

FIG. 1 is a flowchart comprising the steps of: Step 1.1: Creating a new file or storage area; Step 1.2: Writing a new header page and a page directory at the start of the file or storage area; Step 1.3: Writing a new heap structure following the header and the page directory in the file or storage area; and Step 1.4: Starting an asynchronous logging thread to record any changes made to the file or storage area.

The header page in FIG. 1 is a data structure that contains basic control information about a file or storage area. It contains information such as the byte-sex of the file, a checksum of the header, the location and size of the page directory, the page size, a timestamp, a version number and other relevant information. The page directory is a simple array that indicates which pages in the storage area that are in use, their size and their current allocation state. The new heap structure is essentially an array of fixed size allocators as outlined above. Finally, the asynchronous logging thread is responsible for updating the file or storage area and is discussed in detail later.

When an operating system file or storage area has already been created by a previous call to the 'CreateFile' function an alternative function named 'OpenFile' can be used to open the existing file or storage area and prepare it for use. A flowchart outlining the execution of the 'OpenFile' function in this situation is as shown in FIG. 2.

Figure 2:
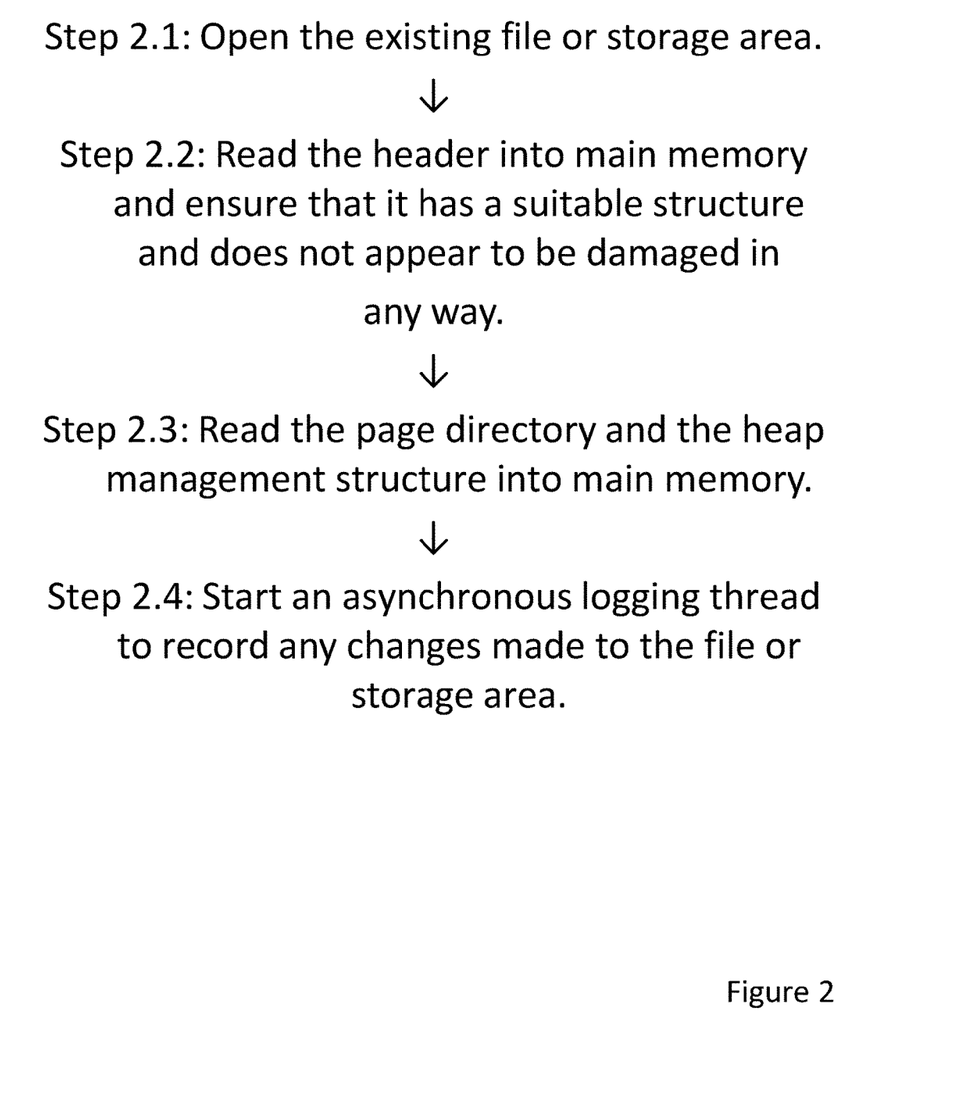
FIG. 2 is a flowchart of the functionality to open the file according to the first embodiment of the invention.

FIG. 2 is a flowchart comprising the steps of: Step 2.1: Opening the existing file or storage area; Step 2.2: Reading the header page into main memory and ensuring that it has a suitable structure and does not appear to be damaged in any way; Step 2.3: Reading the page directory and the heap management structure into main memory; Step 2.4: Starting an asynchronous logging thread to record any changes made to the file or storage area.

A further change compared to the prior art is a function named 'BeginTransaction'. This function creates a structure in main memory to record all the changes made to main memory or the storage area. This structure is used by a function named 'EndTransaction' later to help make any changes permanent or to undo all the changes. The functions 'BeginTransaction' and 'EndTransaction' are similar to those found in the field of transactional databases. The key concept is that the changes made within a transaction scope are either all retained or all lost, so as to ensure the consistency of the stored data. A flowchart outlining the execution of the 'BeginTransaction' function is as shown in FIG. 3.

Figure 3:
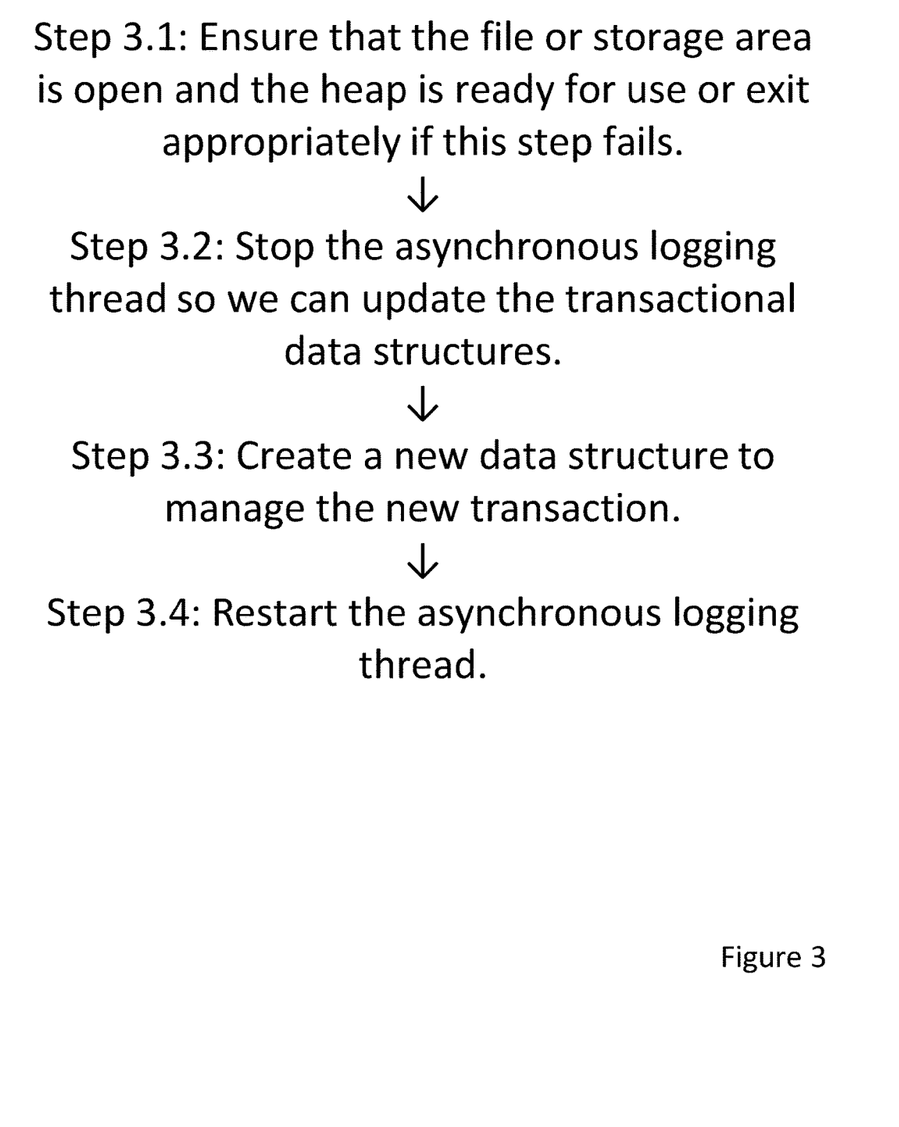
FIG. 3 is a flowchart of the functionality to begin a transaction according to the first embodiment of the invention.

FIG. 3 comprises the steps of: Step 3.1: Ensure that the file or storage area is open and the heap is ready for use or exit appropriately if this step fails; Step 3.2: Stop the asynchronous logging thread so we can update the transactional data structures; Step 3.3: Create a new data structure to manage the new transaction; and Step 3.4: Restart the asynchronous logging thread.

A further change compared to the prior art is a novel parameter named 'Address' in the function named 'New'. The novel 'Address' parameter will contain the offset of the allocation in the associated file or storage area (in bytes) when the call to 'New' returns. As per the prior art, the 'Data' parameter returns the address of the related allocation in main memory and the 'Size1' parameter contains the minimum size of the new allocation. This is one important aspect of a particular embodiment of the invention. The addition of the 'Address' parameter means that in many cases it is no longer necessary to provide any extra code to create storage allocations as this is now handled by this embodiment of the invention.

The above changes therefore provide a significant simplification when compared to the prior art and particular embodiments of the invention typically supersede a wide variety of historical functionality, such as calls to known functions like 'read' and 'write'. Advantageously various embodiments of the present invention do not require the user to know where suitable storage space is available in the file or storage device, as various embodiments of the invention beneficially find suitable main memory and storage space and then transactionally allocate it.

Figure 4:
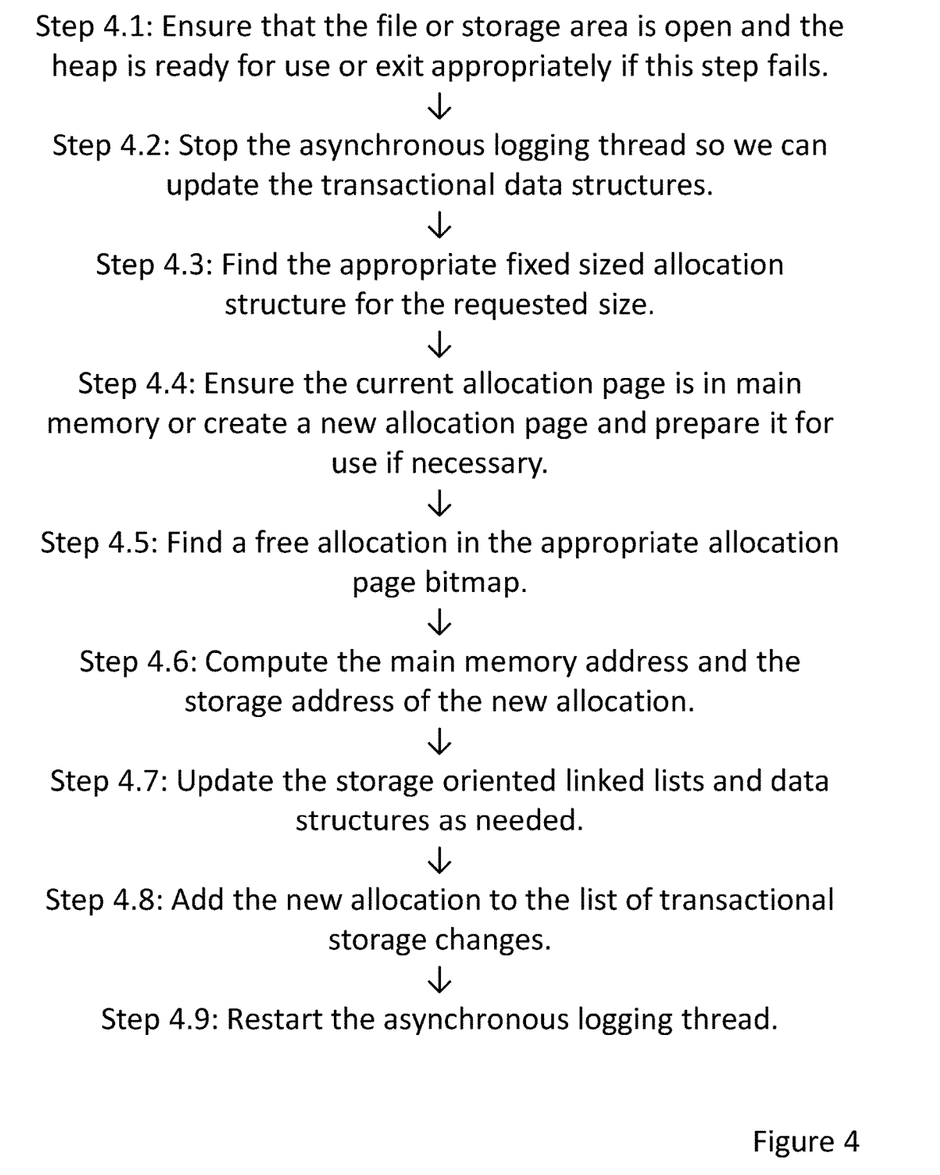
FIG. 4 is a flowchart of the functionality to create a combined memory and storage allocation according to the first embodiment of the invention.

FIG. 4 is a flowchart comprising the steps of: Step 4.1: Ensure that the file or storage area is open and the heap is ready for use or exit appropriately if this step fails; Step 4.2: Stop the asynchronous logging thread so that the transactional data structures can be updated; Step 4.3: Find the appropriate fixed sized allocation structure for the requested size; Step 4.4: Ensure the current allocation page is in main memory or create a new allocation page and prepare it for use if necessary; Step 4.5: Find a free allocation in the appropriate allocation page bitmap; Step 4.6: Compute the main memory address and the storage address of the new allocation; Step 4.7: Update the storage oriented linked lists and data structures as needed; Step 4.8: Add the new allocation to the list of transactional storage changes; and Step 4.9: Restart the asynchronous logging thread.

A further feature of various embodiments of the present invention is the 'Resize' function which has three parameters including a new novel parameter named 'Address'. The novel 'Address' parameter contains the offset of the allocation in the associated file or storage device (in bytes) when the call is made and an updated offset when the call to 'Resize' returns. As per the prior art, the 'Data' parameter is the address of the related allocation in main memory and contains an updated address when the call returns and the 'Size2' parameter contains the minimum size of the adjusted allocation.

Such a feature provides an important advantage of various embodiments of the present invention. In this case, we see that an allocation in a file or storage device can be resized in the same way as main memory allocations can be resized. In the prior art, achieving this has been difficult to implement and often unreliable typically resulting in system crashes and the like. Various embodiments of the present invention enable the adjustment of data stored in files or storage devices to be made more easily and reliably. A flowchart outlining the execution of the 'Resize' function in this situation is as shown in FIG. 5.

Figure 5:
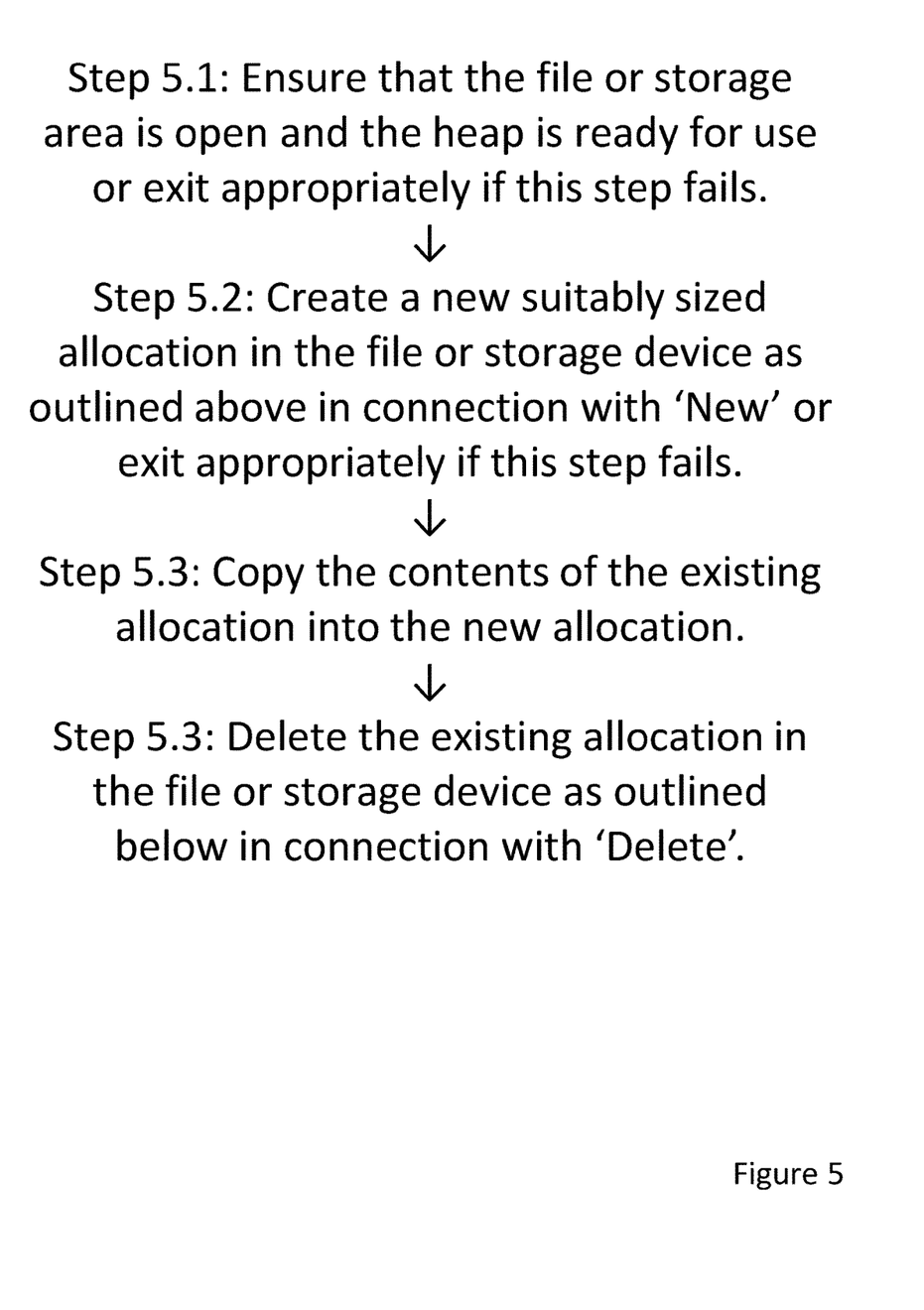
FIG. 5 is a flowchart of the functionality to resize a combined memory and storage allocation according to the first embodiment of the invention.

FIG. 5 is a flowchart comprising the steps of: Step 5.1: Ensure that the file or storage area is open and the heap is ready for use or exit appropriately if this step fails; Step 5.2: Create a new suitably sized allocation in the file or storage device as outlined above in connection with 'New' or exit appropriately if this step fails; Step 5.3: Copy the contents of the existing allocation into the new allocation; and Step 5.3: Delete the existing allocation in the file or storage device as outlined below in connection with 'Delete'.

A further new feature of various embodiments of the invention is the 'Delete' function which is passed a single parameter called 'Address'. The use of the 'Address' parameter is preferred as it may enable a more efficient mechanism for deleting a combined main memory and storage allocation. A flowchart outlining the execution of the 'Delete' function in this situation is as shown in FIG. 6.

Figure 6:
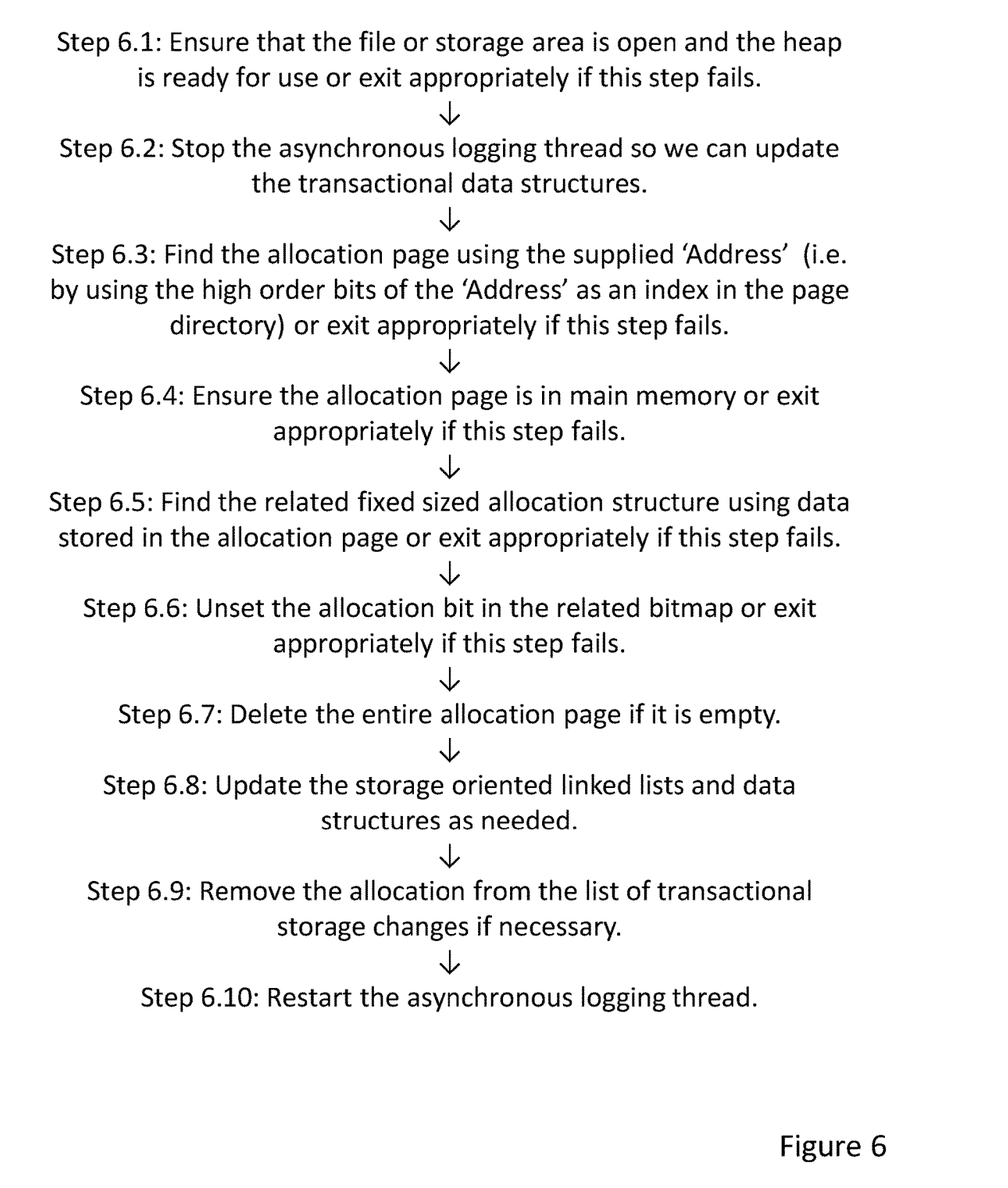
FIG. 6 is a flowchart of the functionality to delete a combined memory and storage allocation according to the first embodiment of the invention.

FIG. 6 is a flowchart comprising the steps of: Step 6.1: Ensure that the file or storage area is open and the heap is ready for use or exit appropriately if this step fails; Step 6.2: Stop the asynchronous logging thread so the transactional data structures can be updated; Step 6.3: Find the allocation page using the supplied 'Address' (i.e. by using the high order bits of the 'Address' as an index in the page directory) or exit appropriately if this step fails; Step 6.4: Ensure the allocation page is in main memory or exit appropriately if this step fails; Step 6.5: Find the related fixed sized allocation structure using data stored in the allocation page or exit appropriately if this step fails; Step 6.6: Unset the allocation bit in the related bitmap or exit appropriately if this step fails; Step 6.7: Delete the entire allocation page if it is empty; Step 6.8: Update the storage oriented linked lists and data structures as needed; Step 6.9: Remove the allocation from the list of transactional storage changes if necessary; and Step 6.10: Restart the asynchronous logging thread.

In a particular embodiment of the invention the execution of 'Delete' may be deferred until the call of the associated 'EndTransaction' function in the situation where 'Delete' is not called within the same transaction as the associated call to 'New'.

A further feature of various embodiments is a function named 'EndTransaction'. This function ensures that any changes made between the calls to 'BeginTransaction' and 'EndTransaction' are applied to the in-memory data structures. This ensures that the effects of the calls to 'New', 'Resize' and 'Delete' are permanently and transactionally committed to the related data pages in main memory. The 'EndTransaction' function then cleans up and deletes any internal data structures or information that is no longer required. The related transaction is now deemed complete but can still be lost in its entirety if the asynchronous logging thread does not update the related file or storage device before the system abnormally terminates or crashes for some reason (see later for more details). A flowchart outlining the execution of the 'EndTransaction' function in this situation is as shown in FIG. 7.

Figure 7:
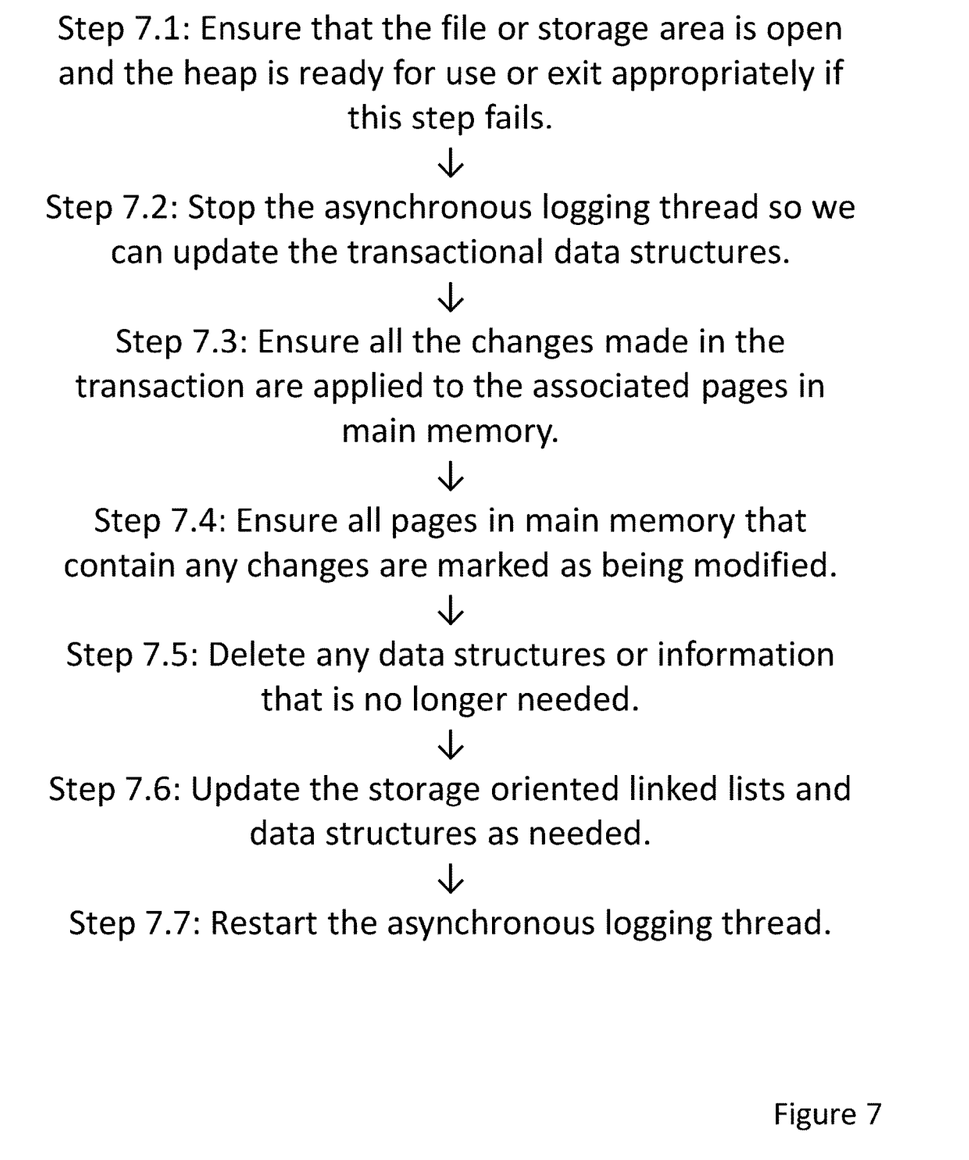
FIG. 7 is a flowchart of the functionality to end the transactional call process according to the first embodiment of the invention.

FIG. 7 is a flowchart comprising the steps of: Step 7.1: Ensure that the file or storage area is open and the heap is ready for use or exit appropriately if this step fails; Step 7.2: Stop the asynchronous logging thread so that the transactional data structures may be updated; Step 7.3: Ensure all the changes made in the transaction are applied to the associated pages in main memory; Step 7.4: Ensure all pages in main memory that contain any changes are marked as being modified; Step 7.5: Delete any data structures or information that is no longer needed; Step 7.6: Update the storage oriented linked lists and data structures as needed; and Step 7.7: Restart the asynchronous logging thread.

The 'BeginTransaction' and 'EndTransaction' functions create a transactional scope in a particular embodiment to ensure that only suitable collections of changes are made to the file or storage area. A transactional scope is useful to prevent the file or storage area from being corrupted or damaged or becoming inconsistent due to hardware, software or other failures. Although transactional scopes are known in the field of databases, they are novel in the context of various embodiments of the invention which are derived from the unrelated field of main memory allocation.

In contrast to the prior art various embodiments of the invention utilize a function named 'CloseFile'. This function closes the file or storage device initially created by a call to 'CreateFile' or opened by a call to 'OpenFile' and releases any associated resources. A flowchart outlining the execution of the 'CloseFile' function in this situation is as shown in FIG. 8.

Figure 8:
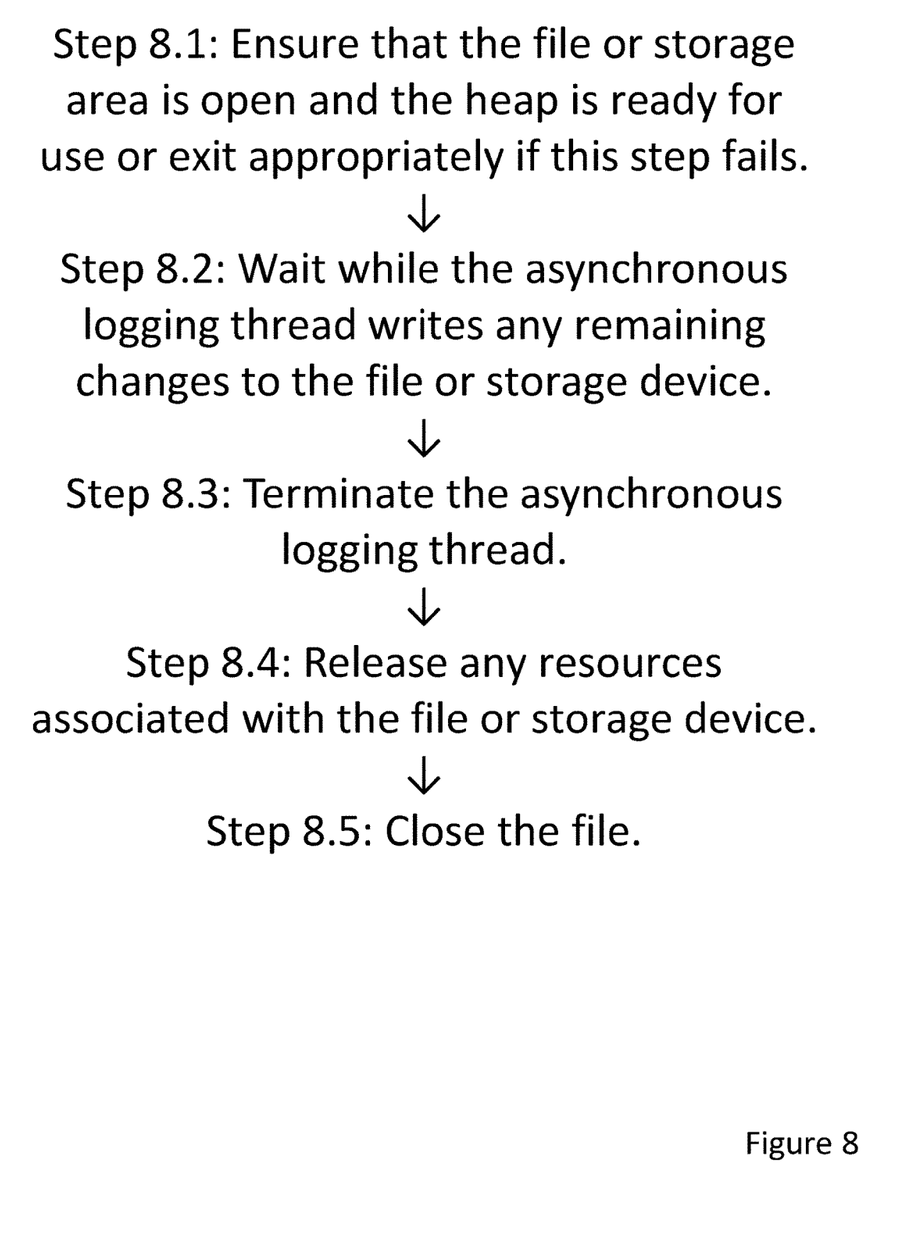
FIG. 8 is a flowchart of the functionality of closing the created file according to the first embodiment of the invention.

The flowchart of FIG. 8 comprises the steps of: Step 8.1: Ensure that the file or storage area is open and the heap is ready for use or exit appropriately if this step fails; Step 8.2: Wait while the asynchronous logging thread writes any remaining changes to the file or storage device; Step 8.3: Terminate the asynchronous logging thread; Step 8.4: Release any resources associated with the file or storage device; and Step 8.5: Close the file.

The asynchronous logging thread mentioned earlier is an important process within particular embodiments of the invention. The asynchronous logging thread is the only process that is permitted to update an associated file or storage device. The asynchronous logging thread automatically executes roughly every 250 ms or immediately if there are any unsaved completed transactions. The asynchronous logging thread temporarily stops any changes being made to pages in main memory and then examines all the pages in main memory to identify pages that contain changes. If it finds any changes it will then allocate a new area of memory called the 'Change Record' and will copy all the active transaction records and a copy of all modified pages into it. It will then permit normal processing to continue while it writes the 'Change Record' to the end of the file or storage device. When this write is complete the header page is updated to show that there is now a 'Change Record' at the end of the file or storage device. After the header page has been updated all of the modified pages are written to back to their original places in the file or storage device. If any of these writes fail then all of the writes are repeated again until they all succeed or the system fails. When all of these writes have completed the header page is updated again to reflect all the changes that have been made to the file or storage device. A flowchart outlining the execution of the asynchronous logging thread in this situation is as shown in FIG. 9.

Figure 9:
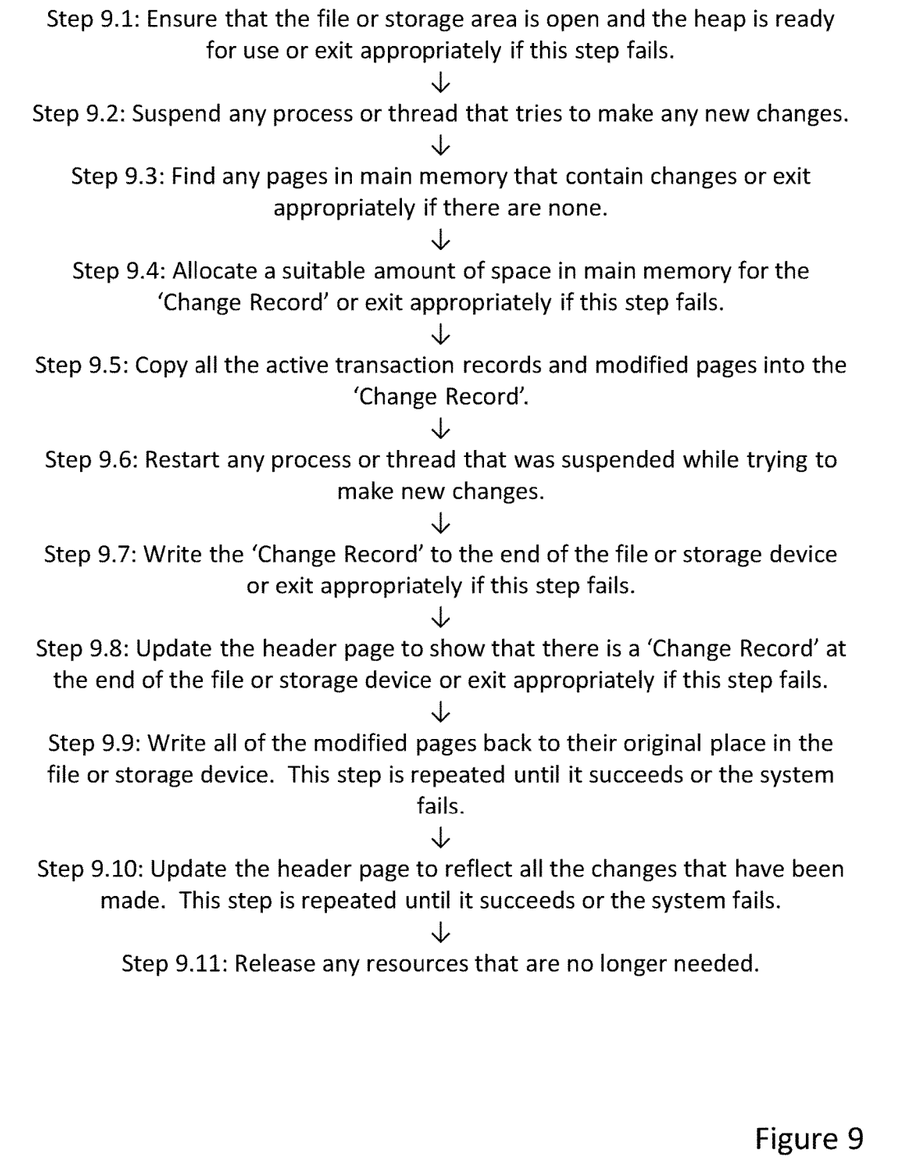
FIG. 9 is a flowchart of the functionality of detecting changes and writing them to the related storage area according to the first embodiment of the invention.

FIG. 9 is a flowchart comprising the steps of: Step 9.1: Ensure that the file or storage area is open and the heap is ready for use or exit appropriately if this step fails; Step 9.2: Suspend any process or thread that tries to make any new changes; Step 9.3: Find any pages in main memory that contain changes or exit appropriately if there are none; Step 9.4: Allocate a suitable amount of space in main memory for the 'Change Record' or exit appropriately if this step fails; Step 9.5: Copy all the active transaction records and modified pages into the 'Change Record'; Step 9.6: Restart any process or thread that was suspended while trying to make new changes; Step 9.7: Write the 'Change Record' to the end of the file or storage device or exit appropriately if this step fails; Step 9.8: Update the header page to show that there is a 'Change Record' at the end of the file or storage device or exit appropriately if this step fails; Step 9.9: Write all of the modified pages back to their original place in the file or storage device. This step is repeated until it succeeds or the system fails; Step 9.10: Update the header page to reflect all the changes that have been made. This step is repeated until it succeeds or the system fails; Step 9.11: Release any resources that are no longer needed.

If the system fails after the 'Change Record' has been written to the end of the file or storage device and the header page has been updated, then the work required to complete the update will be done the next time the file or storage device is successfully opened. In this case, the 'Change Record' will be read back into main memory and all of the modified pages will then be written back to their original place in the file or storage device. Again, if any of the writes fail then all of the writes are repeated until they all succeed or the system fails. A flowchart outlining the execution of this recovery step is as shown in FIG. 10.

Figure 10:
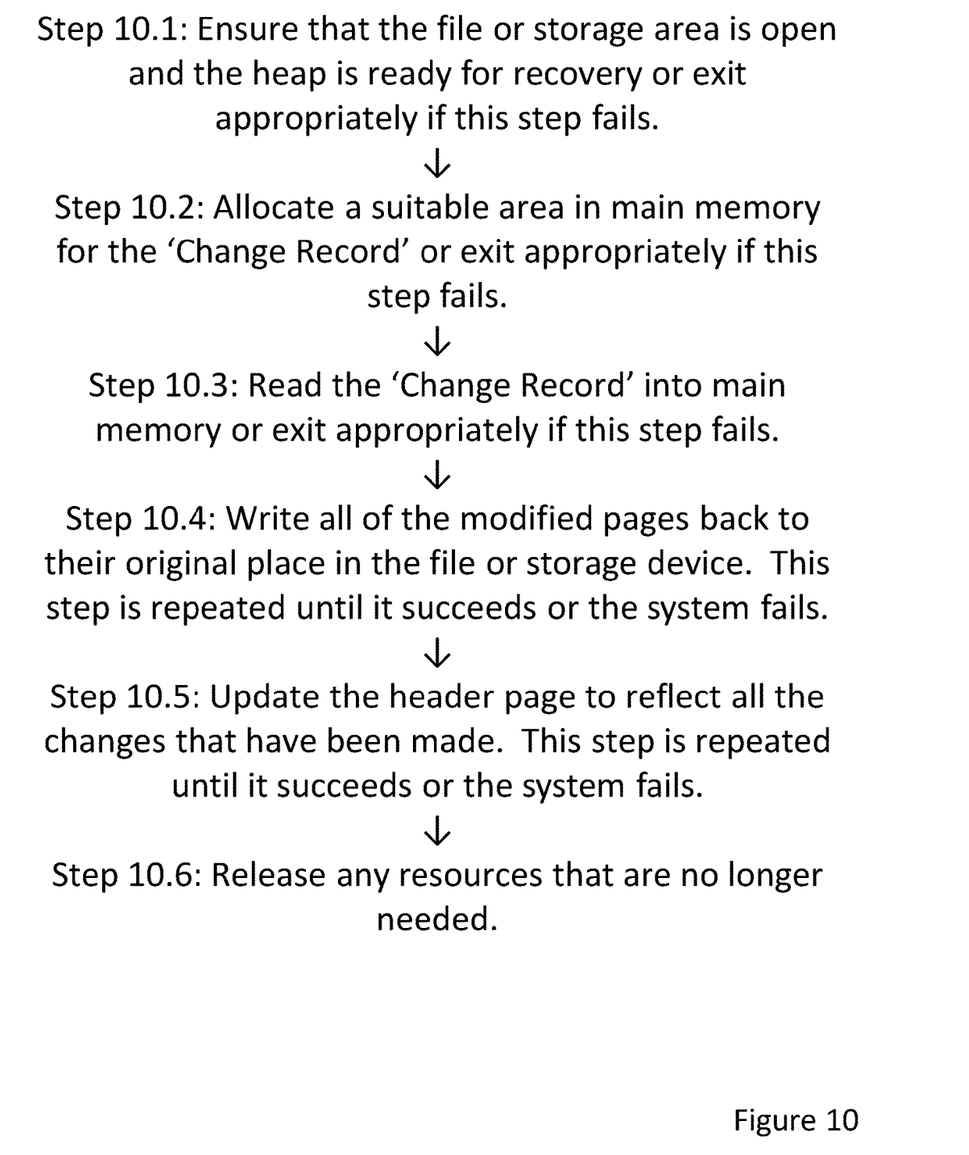
FIG. 10 is a flowchart of the functionality of committing the detected changes to the related storage area after a failure according to the first embodiment of the invention.

FIG. 10 is a flowchart comprising the steps of: Step 10.1: Ensure that the file or storage area is open and the heap is ready for recovery or exit appropriately if this step fails; Step 10.2: Allocate a suitable area in main memory for the 'Change Record' or exit appropriately if this step fails; Step 10.3: Read the 'Change Record' into main memory or exit appropriately if this step fails; Step 10.4: Write all of the modified pages back to their original place in the file or storage device. This step is repeated until it succeeds or the system fails; Step 10.5: Update the header page to reflect all the changes that have been made. This step is repeated until it succeeds or the system fails; and Step 10.6: Release any resources that are no longer needed.

The asynchronous logging thread operates in this manner to beneficially avoid an issue known as a 'Torn Write'. Without such a process if an updated page was initially directly written back to the correct place in the storage area a problem could occur if the system failed half way through the write. In this case, the start of a page might contain updated information whereas the end of the page might remain unmodified (i.e. the data in the page would be inconsistent). Such inconsistencies can result in data corruption and other related problems. In particular embodiments, the asynchronous logging thread writes all the modified pages to the end of the storage area first so that any 'Torn Write' can be rewritten multiple times as necessary to overcome this issue. This is particularly important as various embodiments of the invention support pages that can be multiple megabytes in size and this increases the likelihood of a 'Torn Write'. Again, this is a key feature of various embodiments of the invention as they allows changes to be reliably made that are only limited by main memory and storage space to a file or storage device, which is typically not possible in other transactional systems.

CONCLUSION

Many modifications and other embodiments of the invention will come to mind to one skilled in the art to which this invention pertains, having the benefit of the teaching presented in the foregoing descriptions and the associated drawings. Therefore, it is to be understood that the invention is not to be limited to the specific embodiments disclosed and that modifications and other embodiments are intended to be included. Although specific terms are employed herein, they are used in a generic and descriptive sense only and not for the purposes of limitation.

It should also be understood that any references to the term "the invention" do not necessarily reflect an intention by the drafter to refer to the particular aspects of the invention that are covered by the application's claims. Rather, the term "invention" should be understood to refer collectively to various embodiments of the overall inventive concepts described above, aspects of which may or may not be covered by the claims of the instant application or any resulting patents.

REFERENCES

[DSA-1995] Paul R. Wilson, Mark S. Johnstone, Michael Neely and David Boles. Dynamic Storage Allocation: A survey and Critical Review. Proc. 1995 Int'l. Workshop on Memory Management, Kinross, Scotland, UK, Sep. 27-29, 1995, Springer Verlag LNCS.

[HOD-2013] Kristi L. Berg, Tom Seymour and Richa Goel. History of Databases. International Journal of Management and Information Systems—First Quarter 2013 Volume 17, Number 1.

What is claimed is:

1. A computer implemented method of dynamically managing storage and memory in an operating system on a computing device, the method comprising:
for a first program, or function, requiring a storage allocation on the device;
identifying and subsequently allocating a first memory space for the first program;
identifying and subsequently allocating a first storage space for the first program;
recording the allocation of both the first storage space and first memory space as a first memory page, such that the first memory allocation and first storage allocation are recorded together in the first memory page;
performing a first update to the first memory space;
performing a second updated to the first storage space as a result of the first update to the first memory space; and
recording the first update and second update in the first memory page.

2. The method of claim 1 wherein the page is a fixed multiple power of 2 in size.

3. The method of claim 2 wherein the page is split into one or more sub-pages, wherein the sub-page is a smaller power of two in size.

4. The method of claim 1 wherein the memory and storage allocations match in terms of alignment and size.

5. The method of claim 4 wherein information regarding the heap structures and allocations are stored at the start of the page.

6. The method of claim 4 wherein the page is a fixed multiple power of 2 in size.

7. The method of claim 6 wherein the page is split into one or more sub-pages, wherein the sub-page is a smaller power of two in size.

8. The method of claim 6 further comprising the steps of:
amending the page and recording the changes to the page in a second area of the main memory, wherein the second area of the main memory is distinct from the first area of the main memory.

9. The method of claim 8 wherein the recording process comprises the steps of:
copying one or more the pages that have been identified as having been changed to a further area of the main memory, wherein the further area of the main memory is distinct from the first area of the main memory;
updating the header page of the storage area with information to reflect the changes in content of the remainder of the storage area;
upon completion of the updating of the header page of the storage area copying the updated pages to their original locations.

10. The method of claim 8 wherein the recording of the changes occurs periodically.

11. The method of claim 10 wherein the recording process comprises the steps of:
copying one or more the pages that have been identified as having been changed to a further area of the main memory, wherein the further area of the main memory is distinct from the first area of the main memory;
updating the header page of the storage area with information to reflect the changes in content of the remainder of the storage area;
upon completion of the updating of the header page of the storage area copying the updated pages to their original locations.

12. The method of claim 1 wherein the page is split into one or more sub-pages, wherein the sub-page is a smaller power of two in size.

13. The method of claim 1 wherein information regarding the heap structures and allocations are stored at the start of the page.

14. The method of claim 13 further comprising the steps of:
amending the page and recording the changes to the page in a second area of the main memory, wherein the second area of the main memory is distinct from the first area of the main memory.

15. The method of claim 1 further comprising the steps of:
amending the page and recording the changes to the page in a second area of the main memory, wherein the second area of the main memory is distinct from the first area of the main memory.

16. The method of claim 15 wherein the recording process comprises the steps of:
copying one or more the pages that have been identified as having been changed to a further area of the main memory, wherein the further area of the main memory is distinct from the first area of the main memory;
updating the header page of the storage area with information to reflect the changes in content of the remainder of the storage area;
upon completion of the updating of the header page of the storage area copying the updated pages to their original locations.

17. The method of claim 15 wherein the recording of the changes occurs periodically.

18. The method of claim 17 wherein the recording process comprises the steps of:
copying one or more the pages that have been identified as having been changed to a further area of the main memory, wherein the further area of the main memory is distinct from the first area of the main memory;
updating the header page of the storage area with information to reflect the changes in content of the remainder of the storage area;
upon completion of the updating of the header page of the storage area copying the updated pages to their original locations.

19. The method of claim 18 further comprising the steps of:
resizing the allocation of one or both of the first memory allocation and first storage allocation;
identifying free memory and storage for the resized allocation;
computing new memory and storage addresses for the resized allocation; and
updating the memory page and storage area.

20. The method of claim 1 further comprising the steps of:
resizing the allocation of one or both of the first memory allocation and first storage allocation;
identifying free memory and storage for the resized allocation;
computing new memory and storage addresses for the resized allocation; and
updating the memory page and storage area.

21. The method of claim 1, the method further comprising:
upon subsequent referencing of any part of the first page, bringing the entire page into a first area of the main memory of the computing device such that the allocated first storage space is accessible to the main memory.

\* \* \* \* \*